(12) United States Patent
Friesen et al.

(10) Patent No.: US 9,413,048 B2
(45) Date of Patent: Aug. 9, 2016

(54) AIR CATHODE WITH GRAPHITE BONDING/BARRIER LAYER

(71) Applicant: Fluidic, Inc., Scottsdale, AZ (US)

(72) Inventors: Cody A. Friesen, Fort McDowell, AZ (US); Joel Hayes, Chandler, AZ (US); Kent Berchin-Miller, Gilbert, AZ (US)

(73) Assignee: FLUIDIC, INC., Scottsdale, AZ (US)

( * ) Notice: Subject to any disclaimer, the term of this patent is extended or adjusted under 35 U.S.C. 154(b) by 647 days.

(21) Appl. No.: 13/668,185

(22) Filed: Nov. 2, 2012

(65) Prior Publication Data

US 2013/0115526 A1    May 9, 2013

Related U.S. Application Data (60) Provisional application No. 61/556,021, filed on Nov. 4, 2011.

(51) Int. Cl.
  *H01M 12/06* (2006.01)
  *H01M 4/86* (2006.01)
  *H01M 12/08* (2006.01)

(52) U.S. Cl.
  CPC ............ *H01M 12/06* (2013.01); *H01M 4/8626* (2013.01); *H01M 12/08* (2013.01); *H01M 4/8668* (2013.01); *Y02E 60/128* (2013.01); *Y02E 60/50* (2013.01); *Y02E 60/52* (2013.01); *Y10T 156/10* (2015.01)

(58) Field of Classification Search
  CPC ... Y02E 60/128; Y02E 60/52; H01M 4/8647; H01M 4/8668; H01M 12/06; H01M 12/065; H01M 12/08
  See application file for complete search history.

(56) References Cited

U.S. PATENT DOCUMENTS

| | | | |
|---|---|---|---|
| 8,168,337 B2 | 5/2012 | Friesen et al. | |
| 8,309,259 B2 | 11/2012 | Friesen et al. | |
| 2005/0201918 A1* | 9/2005 | Gordon et al. | 423/263 |
| 2008/0160413 A1* | 7/2008 | Dopp et al. | 429/223 |
| 2010/0119895 A1 | 5/2010 | Friesen et al. | |
| 2010/0285375 A1 | 11/2010 | Friesen et al. | |
| 2011/0003213 A1* | 1/2011 | Burchardt et al. | 429/402 |
| 2011/0070506 A1 | 3/2011 | Friesen et al. | |
| 2011/0086278 A1 | 4/2011 | Friesen et al. | |
| 2011/0200893 A1 | 8/2011 | Friesen et al. | |
| 2011/0250512 A1 | 10/2011 | Friesen et al. | |
| 2011/0316485 A1 | 12/2011 | Krishnan et al. | |
| 2012/0015264 A1 | 1/2012 | Friesen et al. | |

(Continued)

*Primary Examiner* — Ula C Ruddock
*Assistant Examiner* — Lisa S Park
(74) *Attorney, Agent, or Firm* — Pillsbury Winthrop Shaw Pittman, LLP (57) ABSTRACT

An electrochemical cell includes a housing, a fuel electrode comprising a metal fuel; an oxidant electrode spaced from the fuel electrode, having fuel electrode and oxidant facing sides, and a liquid ionically conductive medium for conducting ions between the fuel and oxidant electrodes to support electrochemical reactions thereat. The fuel and oxidant electrodes are configured to, during discharge, oxidize the metal fuel at the fuel electrode and reduce a gaseous oxidant at the oxidant electrode to generate a discharge potential difference therebetween for application to a load. The oxidant electrode includes an active layer configured to participate in the electrochemical reactions, and a current collector electrically coupled to the active layer. The oxidant electrode further includes a graphite layer comprising a mixture of graphite particles and solvophobic binder, the graphite layer providing a surface thereof for exposure to a sealant that adheres the oxidant electrode to the housing.

40 Claims, 7 Drawing Sheets

(56) References Cited

U.S. PATENT DOCUMENTS

2012/0068667 A1 3/2012 Krishnan et al.
2012/0139496 A1 6/2012 Friesen et al.
2012/0202127 A1 8/2012 Friesen et al.
2012/0321969 A1 12/2012 Friesen et al.

* cited by examiner

AIR CATHODE WITH GRAPHITE BONDING/BARRIER LAYER

This application claims the benefit of U.S. Provisional Application No. 61/556,021, filed Nov. 4, 2011, the content of which is incorporated in its entirety herein by reference.

FIELD

The present invention is generally related to electrochemical cells, and more particularly to electrochemical cells utilizing a liquid ionically conductive medium.

BACKGROUND

Many types of electrochemical cells utilize a liquid ionically conductive medium to support electrochemical reactions within the cell. For example, a metal-air electrochemical cell system may comprise a plurality of cells, each having a fuel electrode serving as an anode at which metal fuel is oxidized, and an air breathing oxidant electrode at which oxygen from ambient air is reduced. Such a cell may include the liquid ionically conductive medium to communicate the oxidized/reduced ions between the electrodes.

In some electrochemical cell systems utilizing a liquid ionically conductive medium, an air-permeable but liquid-impermeable membrane is utilized as part of the oxidant electrode, so as to permit the oxygen from the ambient air to enter the oxidant electrode, while preventing the liquid ionically conductive medium from escaping (i.e. leaking out of) the electrochemical cell. The air-permeable but liquid-impermeable membrane may be coupled to an active layer of the oxidant electrode, such that active materials in the active layer contact the liquid ionically conductive medium to facilitate electrochemical reactions within the cell. In some cases, the air-permeable but liquid-impermeable membrane may be laminated to the active layer and/or a current collector screen for the oxidant electrode. In some cases, the layers, screens, and membranes of the oxidant electrode may be bonded together, potentially utilizing a variety of pressing or rolling techniques, and may form a solid unit suitable for assembly into the housing of the electrochemical cell.

In some cases, one or more glues may be utilized to bind the oxidant electrode to the housing. It may be appreciated, however, that in some cases the glue might suffer adhesion issues with the current collectors. Such issues may particularly be an issue at the borders due to assembly processing of the oxidant electrode. For example, in some cases assembly of conventional oxidant electrodes may potentially result in the current collector protruding through a face of the oxidant electrode in some areas. Additionally, such issues may result in seepage of ionically conductive medium through or around the edges of the oxidant electrode. Among other improvements, the present application endeavors to provide an effective and improved oxidant electrode composition that may prevent issues of glue adhesion or other leakage of the ionically conductive medium at the borders of the oxidant electrode, without adversely affecting the performance of the cell during operation.

SUMMARY

According to an embodiment, an electrochemical cell includes a housing, a fuel electrode comprising a metal fuel, an oxidant electrode spaced from the fuel electrode, having a fuel electrode-facing side and an oxidant-facing side, and a liquid ionically conductive medium for conducting ions between the fuel and oxidant electrodes to support electrochemical reactions at the fuel and oxidant electrodes. The fuel electrode and the oxidant electrode are configured to, during discharge, oxidize the metal fuel at the fuel electrode and reduce a gaseous oxidant at the oxidant electrode to generate a discharge potential difference therebetween for application to a load. The oxidant electrode includes an active layer configured to participate in the electrochemical reactions at the oxidant electrode. The oxidant electrode also includes a current collector electrically coupled to the active layer. The oxidant electrode further includes a graphite layer comprising a mixture of graphite particles and solvophobic binder, the graphite layer providing a surface thereof for exposure to a sealant that adheres the oxidant electrode to the housing.

According to another embodiment, an oxidant electrode is provided for an electrochemical cell utilizing a fuel electrode comprising a metal fuel and a liquid ionically conductive medium configured to conduct ions between the fuel electrode and the oxidant electrode to support electrochemical reactions at the fuel and oxidant electrodes. The oxidant electrode includes an active layer configured to participate in the electrochemical reactions at the oxidant electrode, a current collector electrically coupled to the active layer, and a graphite layer comprising a mixture of graphite particles and solvophobic binder. The graphite layer provides a surface thereof for exposure to a sealant that adheres the oxidant electrode to the housing.

According to another embodiment, a method for assembling an oxidant electrode for an electrochemical cell includes providing an active layer configured to participate in the electrochemical reactions at the oxidant electrode. The method also includes providing a current collector layer electrically coupled to the active layer. The method additionally includes applying a graphite layer comprising a mixture of graphite particles and solvophobic binder to a surface of the oxidant electrode distal from the active layer, whereby the graphite layer provides a surface thereof for exposure to an adhesive sealant. The method further includes applying the adhesive sealant to couple at least a portion of the graphite layer to a housing associated with the electrochemical cell.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1A:
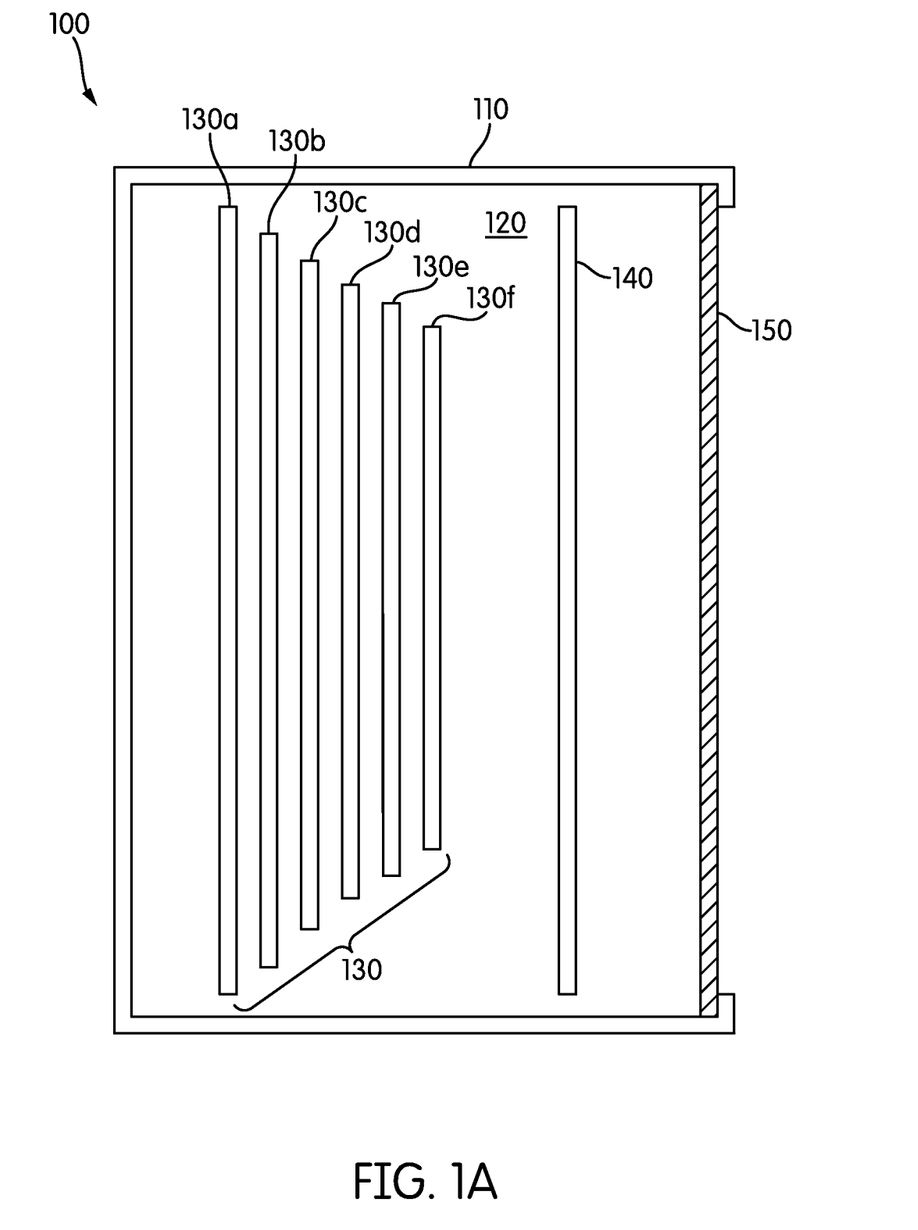
FIGS. 1A and 1B illustrate embodiments of an electrochemical cell having a fuel electrode and an oxidant electrode, separated by a liquid ionically conductive medium configured to conduct ions therebetween.
Figure 1B:
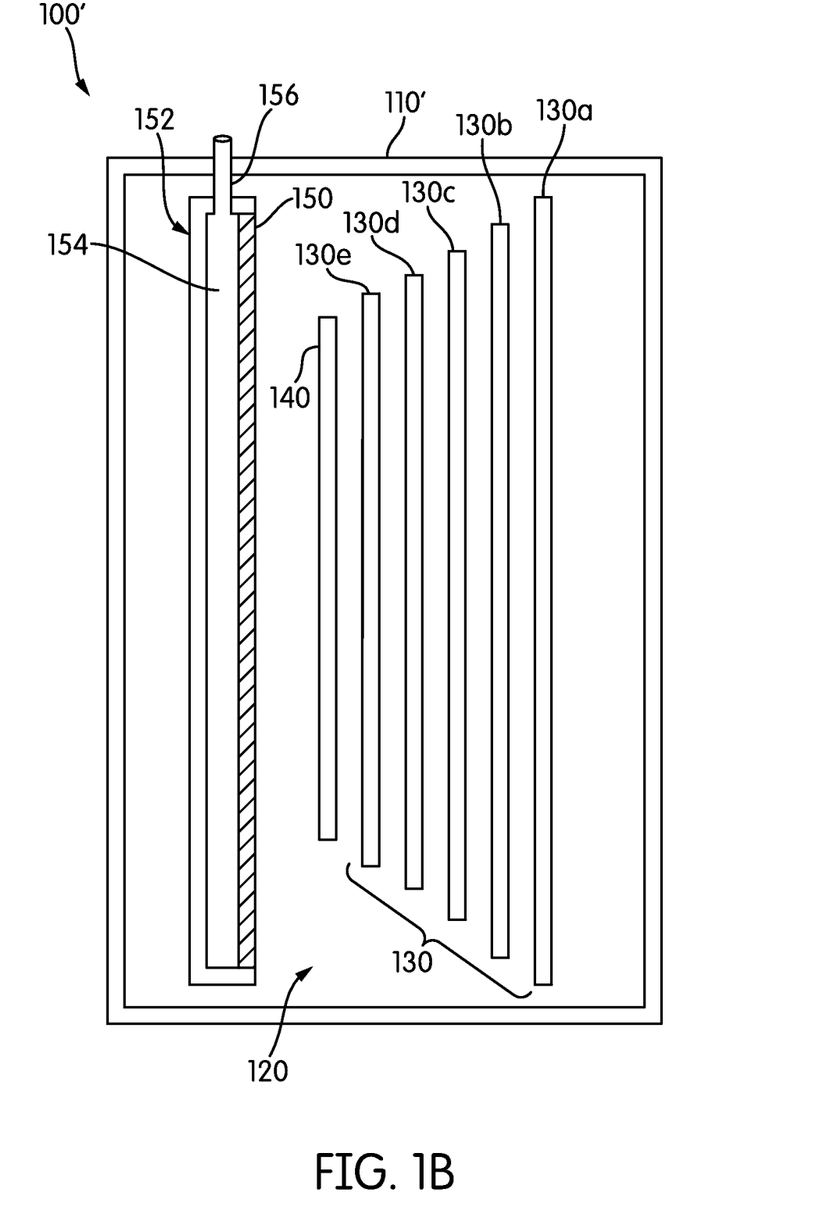

FIGS. 1A and 1B illustrate schematic views of embodiments of electrochemical cells having differing configurations. For example, FIG. 1A illustrates an electrochemical cell 100. As shown, the electrochemical cell 100 may be contained at least partially in a housing 110. Although the housing 110 is depicted as associated with a single electrochemical cell 100 in various embodiments, the housing may be shared by a plurality of cells 100, which in some embodiments may be electrically connected in either series or parallel. The cells 100, described in greater detail below, are configured to utilize a liquid ionically conductive medium that flows through or is otherwise contained in and/or constrained by portions of the housing 110, to conduct ions therein. The ionically conductive medium will also be described in greater detail below.

While in some embodiments the ionically conductive medium may be generally stationary within the housing 110, such as in a pool or other quantity of ionically conductive medium, in other embodiments the ionically conductive medium may be configured to flow into, through, and out of the electrochemical cell 100. In some embodiments, the ionically conductive medium may be stored in a reservoir, and a flow pump may be used to pump the ionically conductive medium through one or more electrochemical cells 100. In embodiments wherein the ionically conductive medium is flowing through the one or more cells 100, the rate of flow may vary in different embodiments. For example, in some embodiments, a constant flow of ionically conductive medium may be maintained, while in other embodiments the ionically conductive medium may be pulsed periodically through the cell. In some embodiments, sensors may be associated with the cell, and may provide signals (including but not limited to an indication of the passage of time, or an indication of a reduction of cell performance), which may prompt the flow pump to flow or pulse the ionically conductive medium. In some embodiments, including those where multiple cells 100 share a common flow of ionically conductive medium, one or more of the electrochemical cells 100 may contain therein one or more flow dispersers, such as is described in U.S. patent application Ser. No. 13/362,775, incorporated herein in its entirety by reference, which may disperse the ionically conductive medium to prevent shunt current from being conducted through the ionically conductive medium between cells 100.

It may be appreciated that joints or junctures in the housing 110 may be sealed together so as to contain the ionically conductive medium therein, or define a flow path therethrough. As such, in some embodiments a sealing material may be applied within the cell 100 to ensure liquid impermeability and prevent leakage. In various embodiments, the sealing material may comprise or include plastic or rubber gaskets, adhesives, or other sealants, including but not limited to solvent-bond sealants, single or two-part (i.e. base and accelerator) epoxies, or UV/thermally cured epoxies. In various embodiments, the sealants may comprise ABS cements, epoxies, or other sealants, including but not limited to those from one or more of Oatey, Weld-on, Eager Polymer, MagnaTec, Scotchweld, and Resinlab. Such sealants may be configured to prevent the undesirable loss of ionically conductive medium or flow pressure at the site where elements of the cell 100 join. In an embodiment, the sealing material may be non-conductive and electrochemically inert, to prevent interference with the electrochemical reactions of the cell 100.

The electrochemical cell 100 may be of any suitable structure or composition, including but not limited to being formed from plastic, metal, resin, or combinations thereof. Accordingly the cell 100 may be assembled in any manner, including being formed from a plurality of elements, being integrally molded, or so on. Embodiments including a flow of the ionically conductive medium through the cell 100 may differ in the structure and configuration of such flow, and those described herein are merely exemplary, and is not intended to be limiting in any way. For example, in various embodiments the cell 100 and/or the housing 110 may include elements or arrangements from one or more of U.S. patent application Ser. Nos. 12/385,217, 12/385,489, 12/549,617, 12/631,484, 12/776,962, 12/885,268, 12/901,410, 13/028,496, 13/083,929, 13/167,930, 13/185,658, 13/230,549, 13/299,167, 13/362,775, 13/526,432, 13/531,962, 13/532,374, 13/566,948, and 61/556,011, each of which are incorporated herein in their entireties by reference.

As shown in FIG. 1A, defined within the housing 110 of the cell 100 is a cell chamber 120 that is configured to house, which may include facilitating a defined flow therethrough, the ionically conductive medium. A fuel electrode 130 of the cell 100 may be supported in the cell chamber 120 so as to be contacted by the ionically conductive medium. In an embodiment, the fuel electrode 130 is a metal fuel electrode that functions as an anode when the cell 100 operates in discharge, or electricity generating, mode, as discussed in further detail below. As shown, in some embodiments the fuel electrode 130 may comprise a plurality of permeable electrode bodies 130a-130f. Although in the illustrated embodiment six permeable electrode bodies 130a-130f are used, in other embodiments any number are possible. Each permeable electrode body 130a-130f may include a screen that is made of any formation that is able to capture and retain, through electrodepositing, or otherwise, particles or ions of metal fuel from the ionically conductive medium that flows through or is otherwise present within the cell chamber 120. In an embodiment, electrode body 130a may be a terminal electrode body, configured such that when charging, metal fuel may generally grow on the electrode bodies 130a-f in a direction defined from electrode body 130a towards electrode body 130f. Although in the illustrated embodiment, the permeable electrode bodies 130a-130f may have different sizes so that a stepped scaffold configuration may be used, as described by U.S. patent application Ser. No. 13/167,930, incorporated by reference above, in other embodiments the permeable electrode bodies 130a-130f may have substantially the same size.

In some embodiments, a plurality of spacers may separate the permeable electrode bodies 130a-130f so as to create flow lanes in the fuel electrode 130. The plurality of spacers may be connected to the housing 110 so that the fuel electrode 130 may be held in place relative to the housing 110. In some such embodiments, the spacers may be non-conductive and electrochemically inert so they are inactive with regard to the electrochemical reactions in the cell 100. In some embodiments, the spacers may be made from a suitable plastic material, such as polypropylene, polyethylene, polyester, noryl, ABS, fluoropolymer, epoxy, or so on. The flow lanes in the fuel electrode 130 may be three-dimensional, and have a height that is substantially equal to the height of the spacers. The spacers are optional and may be omitted in some embodiments.

In some embodiments of the cell 100, such as that illustrated, a charging electrode 140 may be positioned spaced from the fuel electrode 130, distal from the terminal electrode body 130*a* (i.e. proximal to the electrode body 130*f*). In some embodiments, the charging electrode 140 may be a portion of the fuel electrode 130, for instance a metal electrode separated from but bonded to the fuel electrode 130 via a non-conductive spacer (including, for example, being one or more of the permeable electrode bodies 130*b*-130*f*). As with the fuel electrode 130, the charging electrode 140 may be positioned within the cell chamber 120, so as to be in contact with the ionically conductive medium. In some embodiments, such as that shown, the charging electrode 140 may extend at least as far as the longest of the permeable electrode bodies 130*a*-*f*, when those electrode bodies 130*a*-*f* are in a stepped scaffold configuration, or otherwise vary in size. As described in greater detail below, the charging electrode 140 may be configured to participate in the oxidation of an oxidizable reductant species and the reduction of an oxidized metal fuel species, both of which being present in the liquid ionically conductive medium, so as to promote the growth of metal fuel on the fuel electrode 130 during charging of the cell 100.

Further shown in FIG. 1A is an oxidant electrode 150, which is spaced from the fuel electrode 130 and the charging electrode 140, distal from the terminal electrode body 130*a*. As shown, in embodiments containing the separate charging electrode 140, the separate charging electrode 140 is positioned between the oxidant electrode 150 and the fuel electrode 130. In embodiments of the cell 100 lacking the separate charging electrode 140, the oxidant electrode 150 may be utilized both during charging and discharging of the cell 100 (i.e. as an anode during charging and as a cathode during discharging). In the illustrated embodiment of FIG. 1A, the oxidant electrode 150 defines a boundary wall for the cell chamber 120, and is sealed to a portion of the housing 110 so as to prevent seepage of ionically conductive medium therebetween. It may be appreciated, however, in some embodiments the oxidant electrode 150 may be immersed into the ionically conductive medium. For example, FIG. 1B depicts such an embodiment, whereby cell 100' contains a housing 110' that is formed from a plurality of sidewalls and a bottom, such that the oxidant electrode 150 is immersed within the housing 110', instead of forming one of the sidewalls that contain the ionically conductive medium. In particular, the oxidant electrode 150 is coupled to or otherwise installed in an oxidant electrode module 152, which are jointly immersed into the housing 110'. The oxidant electrode module 152 and the oxidant electrode 150 together define an air space 154 therebetween that allows an oxidizer to be exposed to the air side of the oxidant electrode 150. As shown, one or more air channels 156 may be provided so as to permit a supply of oxidizer into the air space 154 immersed into the ionically conductive medium. Additional details of one such embodiment are described in U.S. patent application Ser. No. 13/531,962, incorporated in its entirety above by reference.

Although in some embodiments the oxidizer may be delivered to the oxidant electrode 150 by a passive system, which may be sufficient to allow diffusion or permeation of oxygen from the air into the oxidant electrode 150, in other embodiments different sources of the oxidizer or mechanisms for bringing the oxidizer to the oxidant electrode may be utilized. For example, in an embodiment, a pump such as an air pump may be used to deliver the oxidizer to the oxidant electrode 150 under pressure. The air pump may be of any suitable construction or configuration, including but not limited to being a fan or other air movement device configured to produce a constant or pulsed flow of air or other oxidant. The oxidizer source may be a contained source of oxidizer. In an embodiment, oxygen may be recycled from the electrochemical cell 100', such as is disclosed in U.S. patent application Ser. No. 12/549,617, previously incorporated by reference above. Likewise, when the oxidizer is oxygen from ambient air, the oxidizer source may be broadly regarded as the delivery mechanism, whether it is passive or active (e.g., pumps, blowers, etc.), by which the air is permitted to flow to the oxidant electrode 150. Thus, the term "oxidizer source" is intended to encompass both contained oxidizers and/or arrangements for passively or actively delivering oxygen from ambient air to the oxidant electrode 150.

Besides for positioning and orientation of the oxidant electrode 150, however, it may be appreciated that the cell 110' may generally be otherwise similar to the cell 100. As such, reference to components of the cell 100 may apply equally or with minor modification to the cell 100'. For example, in some embodiments one or more components of the cell 100, such as the fuel electrode 130 and/or the separate charging electrode 140, may be of any suitable construction or configuration, including but not limited to being constructed of Nickel or Nickel alloys (including Nickel-Cobalt, Nickel-Iron, Nickel-Copper (i.e. Monel), or superalloys), Copper or Copper alloys, brass, bronze, or any other suitable metal, including plated metals, such as nickel-plated copper or other such combination of base metal and plated metal. The construction and configuration of the oxidant electrode 150 is a subject of the present application, and is described in greater detail below. It may be appreciated, however, that in various embodiments one or more materials in the cell 100, into which the oxidant electrode 150 is installed, may differ.

The fuel used in the cell 100 may be a metal, such as iron, zinc, aluminum, magnesium, or lithium. By metal, this term is meant to encompass all elements regarded as metals or semimetals on the periodic table, including but not limited to alkali metals, alkaline earth metals, lanthanides, actinides, post-transition and transition metals, either in atomic, molecular (including metal hydrides), or alloy form when collected on the electrode body. However, the present invention is not intended to be limited to any specific fuel, and others may be used. The fuel may be provided to the cell 100 as particles suspended in the ionically conductive medium. In some embodiments, a metal hydride fuel may be utilized in cell 100.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. In some embodiments, the ionically conductive medium is aqueous potassium hydroxide. In an embodiment, the ionically conductive medium may comprise an electrolyte. For example, a conventional liquid electrolyte solution may be used, or a room temperature ionic liquid may be used, as mentioned in U.S. patent application. Ser. Nos. 12/776,962 and 13/526,432, previously incorporated by reference above. In some embodiments, additives may be added to the ionically conductive medium, including, but not limited to additives which enhance the electrodeposition process of the metal fuel on the fuel electrode 130, such as is described in U.S. patent application Ser. No. 13/028,496, previously incorporated by reference above. Such additives may reduce the loose dendritic growth of fuel particles, and thus the likelihood of such fuel particles separating from the fuel electrode 130, for example.

In operation of the cell 100, the fuel may be oxidized at the fuel electrode 130 when the fuel electrode 130 is operating as an anode, and an oxidizer, such as oxygen, may be reduced at the oxidant electrode 150 when the oxidant electrode 150 is operating as a cathode, which is when the cell 100 is connected to a load and the cell 100 is in discharge or electricity generation mode, as discussed in further detail below. The reactions that occur during discharge mode may generate by-product precipitates, e.g., a reducible fuel species, in the ionically conductive medium. For example, in embodiments where the fuel is zinc, zinc oxide may be generated as a by-product precipitate/reducible fuel species. The oxidized zinc or other metal may also be supported by, oxidized with or solvated in the electrolyte solution, without forming a precipitate (e.g. zincate may be a dissolved reducible fuel species remaining in the electrolyte). During a recharge mode, the reducible fuel species, e.g. zinc oxide, may be reversibly reduced and deposited as the fuel, e.g., zinc, onto at least a portion of the fuel electrode 130 that functions as a cathode during recharge mode. During recharge mode, either the oxidant electrode 150 or the separate charging electrode 140, and/or another portion of the fuel electrode 130, as described below, functions as the anode.

In various embodiments, the permeable electrode bodies 130a-f, the separate charging electrode 140, and the oxidant electrode 150 may be connected by a switching system that may be configured to connect the cell 100 to a power supply, a load, or other cells 100 in series. During discharge, the fuel electrode 130 is connected to the load, and operates as an anode so that electrons given off by the metal fuel, as the fuel is oxidized at the fuel electrode 130, flows to the external load. The oxidant electrode 150 functions as the cathode during discharge, and is configured to receive electrons from the external load and reduce an oxidizer that contacts the oxidant electrode 150, specifically oxygen in the air surrounding the cell 100, oxygen being fed into the cell 100, or oxygen recycled from the cell 100.

The operation of the switching system may vary across embodiments, and in some embodiments the operation may be similar to those described in U.S. patent application Ser. No. 13/299,167, incorporated above by reference. As another example, in an embodiment, the external load may be coupled to some of the permeable electrode bodies 130a-130f in parallel, as described in detail in U.S. patent application Ser. No. 12/385,489, incorporated above by reference. In other embodiments, the external load may only be coupled to the terminal permeable electrode body 130a, distal from the oxidant electrode 150, so that fuel consumption may occur in series from between each of the permeable electrode bodies 130a-130f. In some embodiments, the cell 100 may be configured for charge/discharge mode switching, as is described in U.S. patent application Ser. No. 12/885,268, filed on Sep. 17, 2010, previously incorporated by reference above.

In some embodiments, one or more of the electrode bodies 130a-f, the oxidant electrode 150 and/or the charging electrode 140 may be interconnected by the switching system, or any other circuit, so as to selectively facilitate control of the charging and discharging of the cell 100. Switches associated with the switching system may be controlled by a controller, which may be of any suitable construction and configuration, including but not limited to, in some embodiments, conforming generally to those disclosed in U.S. application Ser. Nos. 13/083,929, 13/230,549, and 13/299,167, incorporated by reference above. In various embodiments, the control of the switches of the switching system may be determined based on a user selection, a sensor reading, or by any other input. In some embodiments, the controller may also function to manage connectivity between the load and the power source and a plurality of the cells 100. In some embodiments, the controller may include appropriate logic or circuitry for actuating bypass switches associated with each cell 100 in response to detecting a voltage reaching a predetermined threshold (such as drop below a predetermined threshold).

Figure 2:
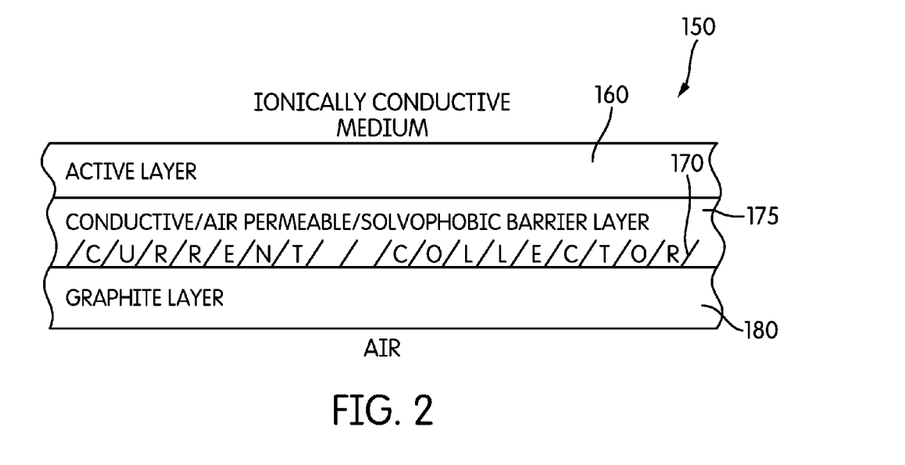
FIG. 2 schematically illustrates a cross sectional view of an embodiment of the oxidant electrode of FIG. 1A or FIG. 1B.

As noted above, the structure and configuration of embodiments of the oxidant electrode 150 are subjects of the present application. Shown in FIG. 2 is a schematic cross sectional view of an embodiment of the oxidant electrode 150. As shown, in an embodiment the oxidant electrode 150 contains a plurality of layers, each of which may be configured to provide certain features for the oxidant electrode 150 as a whole. For example, FIG. 2 shows that the oxidant electrode 150 contains an active layer 160, which may contain those elements of the oxidant electrode 150 that provide for oxygen reduction in the electrochemical cell 100. In an embodiment, the active layer may include catalysts, supported catalysts, and binders that may be characterized as active materials. The active materials serve to create a potential difference between the oxidant electrode and the fuel electrode when the cell is connected to a load. In an embodiment, the active layer may be used to create a potential difference between the oxidant electrode 150 and the fuel electrode 130, when the cell 100 is connected to the load. In an embodiment, the materials of the oxidant electrode 150 that create the potential difference with the fuel electrode 130 may be characterized as the "active material(s)." Accordingly, the oxidant electrode 150 is positioned in the cell housing 110 such that the active layer 160 (and the active materials therein) faces the cell chamber 120 and contacts the ionically conductive medium, whereby ions may be conducted through the ionically conductive medium to and/or from the fuel electrode 130, as described above. In some embodiments, the active materials of the active layer 160 may be formed by a mixture of catalyst particles or materials, conductive matrix and solvophobic materials, sintered, layered, or otherwise bonded to form a composite material. In various embodiments, the active layer 160 may be of any suitable construction or configuration, including but not limited to being constructed of carbon, fluoropolymers such as PTFE, PFA, FEP, and/or PVDF, epoxies, graphite, nickel, activated carbons, fibers such as PTFE, PP, PE, $SiO_2$ (glass), or $Al_2O_3$, or any other suitable metal or alloy. In some embodiments the active layer contains a catalyst for promoting the reduction of oxygen. This catalyst can be incorporated as independent particles or be supported on a conductive substrate, such as carbon black, activated carbon, or graphite, or other common catalysts such as platinum, platinum alloys, $MnO_2$, silver, perovskites, and spinels. In some embodiments, the oxidant electrode may also be a bifunctional electrode (i.e. it may have the ability to perform both oxygen reduction and oxygen evolution functions), thereby obviating the need for a separate charging electrode.

Electrically coupled to the active layer 160, as described in greater detail below, may be a current collector 170, which may be configured to receive electrons from a load for consumption by the oxidant reduction reaction when the cell 100 is in a discharge mode. Likewise, the current collector 170 may be configured to collect electrons from the oxidation reaction at the active layer 160 (i.e. when the oxidant electrode 150 serves as the charging electrode) for delivery to the power supply, to participate in the electrochemical reactions at the active layer 160, when the cell 100 is in a charging mode. The current collector 170 may be of any appropriate construction or configuration, including but not limited to being a metal screen. It may be appreciated that the current collectors 170 conventionally have holes therein that are on the order of 50-2500 µm, but are preferably in the range of 100-1000 µm, and may in some embodiments be uniformly dispersed across its area. These holes serve to increase the area of the current collector to more efficiently distribute or collect electrons, and also allow the transport of gaseous oxidant and/or ionic transport of reduced oxidant species.

Thus, products and reactants can be communicated through the holes to either the ionically conductive medium or the ambient environment. In various embodiments the current collector 170 may be constructed of metals or alloys such as but not limited to nickel or nickel alloys (including nickel cobalt, nickel iron, nickel copper (i.e. Monel), or superalloys), copper or copper alloys, brass, bronze, carbon, platinum, silver, silver-palladium, plated metals (i.e. nickel plated copper), or any other suitable metal or alloy.

As shown in FIG. 2, the current collector 170 may be backed by or at least partially embedded within a barrier layer 175 that may be configured to serve as a backing for the active layer 160 and/or the current collector 170. It may be appreciated that the barrier layer 175 may be of any suitable construction or configuration that prevents permeation of the ionically conductive medium therethrough. Such prevention of permeation of ionically conductive medium may be characterized herein interchangeably as solvophobicity (i.e. solvent repellant), hydrophobicity (i.e. water repellant), hygrophobicity (i.e. liquid repellant), or variants thereof. It may be appreciated that the ionically conductive medium, which may at least partially permeate into the active layer 160, would be generally prevented from traversing further through the oxidant electrode 150 by at least a portion of the barrier layer 175. Although the barrier layer 175 prevents permeation of the ionically conductive medium therethrough, it may be appreciated that the barrier layer 175 is also generally conductive so as to permit electrons to transfer between the active layer 160 and the current collector 170. It may be appreciated, however, that in some embodiments the current collector may be embedded in various locations of the oxidant electrode 150 in relation to the active layer 160. For example, in various embodiments the current collector 170 may be either partially or completely embedded within the active materials of the active layer 160. In some embodiments, the current collector 170 may be at least partially embedded in both the active layer 160 and the barrier layer 175 (i.e. at the interface between the active layer 160 and the barrier layer 175).

As indicated above, the oxidant electrode 150 may be configured to contain the ionically conductive medium within the cell housing 110, or may otherwise be configured to maintain an air space associated with the oxidant electrode 150. The oxidant electrode 150 as a whole may therefore be liquid impermeable, yet air permeable, such that air may enter the cell 100 and permeate into the active layer 160, so that oxygen in the air serves as the oxidant during the electrochemical reactions taking place during discharge of the cell 100, between the active materials of the oxidant electrode 150 and the fuel electrode 130. In an embodiment, as the active layer 160 may be configured to permit at least partial permeation of the ionically conductive medium therein, the liquid-impermeability of the oxidant electrode 150 may be at least partially provided by the barrier layer 175. As indicated above, because the current collector 170 may be at least partially embedded in the barrier layer 175, the barrier layer 175 may also be at least partially conductive, so as to facilitate the transfer/conduction of electrons from the active layer 160 to the current collector 170. Accordingly, in various embodiments, the barrier layer 175 may be of any suitable construction or configuration that is electrically conductive, facilitates supporting the active materials thereon, is air permeable to facilitate permeation of the oxidant therethrough, and is liquid impermeable so as to prevent permeation of the ionically conductive medium out of the cell 100, or into the air space where the oxidant electrode 150 is immersed into the cell 100.

It may be appreciated that in various embodiments the barrier layer 175 serves as a backing material for the active layer 160 and/or the current collector 170. Although the barrier layer 175 may vary across embodiments, in some embodiments the barrier layer 175 may comprise a fluoropolymer. As an example, in various embodiments, the barrier layer 175 may comprise polytetrafluoroethylene (also known as PTFE, or Teflon®), which may in some embodiments be thermo-mechanically expanded (also known as ePTFE, or Gore-Tex®). In other embodiments, the barrier layer 175 may comprise Fluorinated Ethylene Propylene (also known as FEP), or any other fluoropolymer. The barrier layer 175 may also be comprised of other binders such as polypropylene, polyethylene, polyamide, or an epoxy. It may be appreciated that in some embodiments the barrier layer 175 may have sufficient tensile strength through the thickness of the layer so as to prevent buckling or other failure due to the fluid pressure of the ionically conductive medium on the oxidant electrode 150.

In the illustrated embodiment, the current collector 170 is generally positioned proximal to an air-permeable graphite layer 180, described in greater detail below. In some embodiments, the graphite layer 180 may be configured to promote adhesion of the oxidant electrode 150 to the remainder of the cell 100 (i.e. to the cell housing 110). To facilitate adhesion of the oxidant electrode 150 to the remainder of the cell 100, it may be appreciated that the graphite layer 180 may be positioned at an outer surface of the oxidant electrode 150 (i.e. on an air side of the oxidant electrode 150 distal from the active layer 160), so as to provide a large surface area of exposure and adhesion to a bonding or sealing agent, as described in greater detail below. It may be appreciated that the graphite layer 180 may additionally prevent permeation of ionically conductive medium through the oxidant electrode 150, and may serve as a backup to the barrier layer 175, or may be provided in the oxidant electrode 150 as the barrier layer 175. For example, in some embodiments the current collector 170 may be partially or completely embedded in the graphite layer 180. In some such embodiments, the graphite layer 180 could also provide solvophobicity for the oxidant electrode 150, by preventing permeation of ionically conductive medium therethrough. In such an embodiment a portion of the graphite layer 180 may facilitate adhesion of the oxidant electrode 150 to the remainder of the cell 100, such as to the housing 110, while another portion of the graphite layer 180, proximal to the current collector 170, may be conductive, air permeable, and solvophobic, so as to limit permeation of the ionically conductive medium, while conducting electrons between the active layer 160 and the current collector 170.

In some embodiments additional layers or materials may be added to the oxidant electrode 150 so as to improve operation thereof. For example, in some embodiments, additional air-permeable layers may be provided on the air side of the oxidant electrode 150 (such as coupled to the barrier layer 175 or the graphite layer 180 containing the current collector 170 therein) which may further support the solvophobicity and rigidity of the oxidant electrode 150. In some embodiments, an air-permeable but solvophobic layer, such as a fluoropolymer membrane sheet, may be included in the oxidant electrode 150 so as to further promote the solvophobicity of the oxidant electrode 150 as a whole. As described in U.S. patent application 61/556,011, incorporated in its entirety above by reference, problems with blistering and/or peeling/delaminating of the air-permeable but liquid-impermeable membrane away from the remainder of the oxidant electrode 150 may sometimes occur, such as where the current collector 170 is located within the active layer 160. As an example, it may be appreciated that PTFE is a common material used for such membranes, and its lack of tensile strength often permits any blistering or bubbling to grow in an undesirable manner, leading to failure of the membrane. Accordingly, in some such embodiments, an air-permeable reinforcement layer may be provided on the air side of such air-permeable but solvophobic layers, so as to assist in distributing the fluid pressure of the ionically conductive medium on the oxidant electrode 150. In some embodiments, the graphite layer 180 may serve as this air-permeable reinforcement layer.

Although the material composition of the graphite layer 180 may vary across embodiments, it may be appreciated that in some embodiments the graphite layer 180 comprises a combination of binder and graphite. For example, in some embodiments the binder may comprise a fluoropolymer or other binder, such as those described as being in embodiments of the barrier layer 175. For example, in some embodiments the binder may comprise one or more of PTFE, ePTFE, and/or FEP. In some embodiments, the binder may contain multiple types of materials, including multiple types of fluoropolymer. Accordingly, in various embodiments the combination of the binder and the graphite may be solvophobic and air-permeable, as described in greater detail below. In various embodiments, the graphite may be in the form of particles, fibers, or other morphologies that in combination with the binder achieve conductivity, air permeability, and solvophobicity. In an embodiment, the graphite may increase the solvophobicity of the binder, and may be implemented to provide structural or tensile strength for the graphite layer 180. In some embodiments, other materials, such as carbon, nickel, alumina, or other durable materials, may also be incorporated into the graphite layer 180, and may increase the conductivity or structural strength of the graphite layer 180. In some embodiments the graphite layer 180 may include a composite material formed by pressurization and bonding of a mixture that includes the solvophobic and air permeable-binder material (i.e., PTFE), with particles or fibers of the graphite. In some embodiments, the graphite layer 180 may contain approximately 10-80% by weight of the graphite, with some or all of the balance being the binder. More narrowly, in some embodiments the graphite layer 180 may contain approximately 40-60% by weight of the graphite, with some or all of the balance being the binder. For example, in some embodiments, the graphite layer 180 may contain approximately 50% by weight of the graphite, with some or all of the balance being the binder.

As indicated above, in some embodiments, the current collector 170 may be embedded within the graphite layer 180, such that at least a portion of the graphite layer 180 functions as the barrier layer 175. As may be appreciated from FIG. 3 in such an embodiment the material or layer distal from the active layer 160 (and the ionically conductive medium) may be considered the graphite layer 180, while the layer or material including the current collector 170, proximal to the active layer 160 and the ionically conductive medium, may be considered a second graphite layer 180'. In an embodiment, the second graphite layer 180' may be of a similar construction and configuration to the graphite layer 180. As such, it may be appreciated that the graphite layer 180 may include the material which may be exposed to the sealant or other bonding agent, as described below, while the second graphite layer 180' may include the material that predominantly functions as the barrier layer 175 to prevent permeation of ionically conductive medium through the oxidant electrode 150. Although in the illustrated embodiment the current collector 170 is depicted as embedded in the second graphite layer 180', in some embodiments the current collector 170 may be embedded partially into both the graphite layer 180 and the second graphite layer 180', where the graphite layer 180 and the second graphite layer 180' are characterized as separate layers of the oxidant electrode 150, and have different material compositions. Additionally, in some embodiments the current collector 170 may be characterized as a separate layer from the graphite layer 180 and the second graphite layer 180'.

Figure 3:
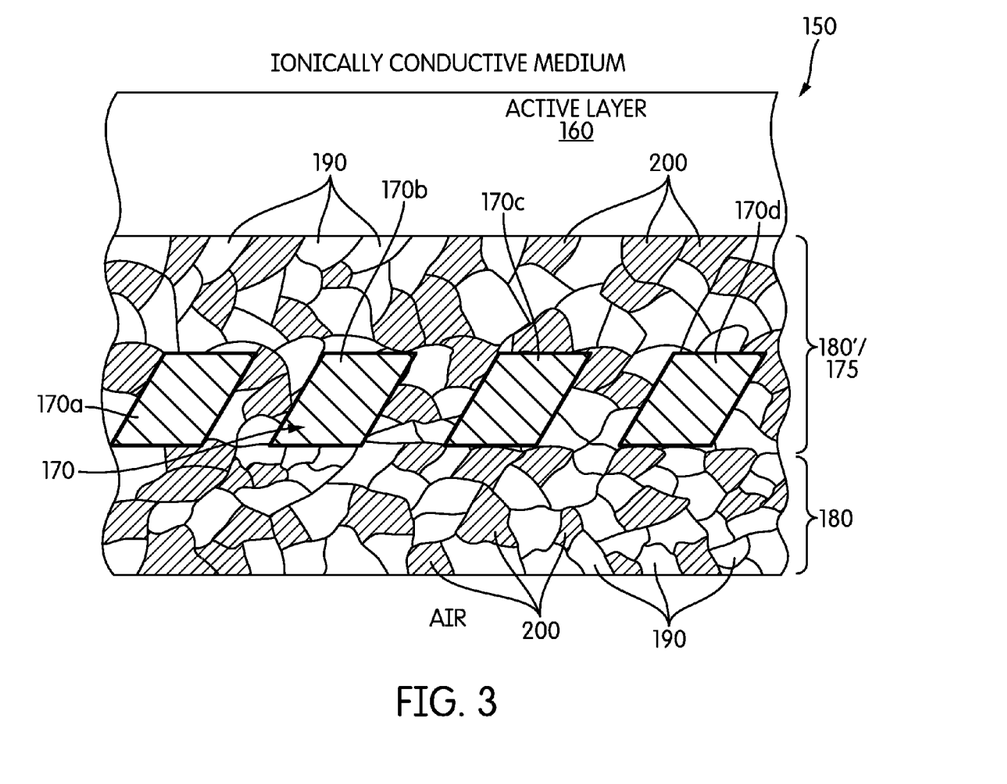
FIG. 3 shows a simplified view of the composition of a portion of the embodiment of the oxidant electrode of FIG. 1A or FIG. 1B.

As indicated above, and shown in FIG. 3, in some embodiments the graphite layer 180 and the second graphite layer 180' may each be assembled from mixtures of an air-permeable solvophobic binder 190 and graphite particles 200. As shown in the greatly exaggerated and simplistic view, the current collector 170 may be a screen that is embedded into the graphite layer 180 so that there are spaces between the screen ligaments (i.e. screen ligaments 170a-170d in the illustrated view) that may be filled with the solvophobic binder 190 and/or the graphite particles 200. The graphite particles 200 may permit electrical conductivity between the current collector 170 and the active layer 160 (not shown in the view of FIG. 3), while the combination of the air-permeable solvophobic binder 190 and the graphite particles 200 are in sufficient concentrations to allow the graphite layer 180 as a whole to permit permeation of the oxidant therethrough, while preventing permeation of the ionically conductive medium therethrough.

As indicated above, in some embodiments, the graphite layer 180 may contain approximately 10-80%, including for example 40-60%, or approximately 50%, by weight of the graphite particles 200, with some or all of the balance being the solvophobic binder 190. Although in the illustrated embodiment it appears that the graphite layer 180 and the second solvophobic layer 190 both contain generally the same proportions of graphite particles 200 and solvophobic binder 190, which may be useful for ease of manufacturing, it may be appreciated that in other embodiments the proportions of graphite particles 200 to solvophobic binder 190 may differ. For example, in some embodiments, the graphite layer 180 may contain a greater concentration of graphite particles 200 than in the second graphite layer 180'. In some such embodiments, the graphite layer 180 may be generally more conductive, but may be generally less solvophobic than the second graphite layer 180'. Accordingly, while ionically conductive medium might partially permeate into the graphite layer 180, the graphite particles 200 may facilitate transfer of electrons to and/or from the current collector 170. Likewise, in such embodiments the second graphite layer 180' may be less conductive, but more optimized to prevent permeation of the ionically conductive medium therethrough, so that the oxidant electrode 150 as a whole is generally solvophobic. In other embodiments, the graphite particles 200 of the second graphite layer 180' may be of such a concentration so as to primarily increase the strength of the second graphite layer 180', as opposed to increasing solvophobicity or conductivity of the second graphite layer 180'.

Figure 4:
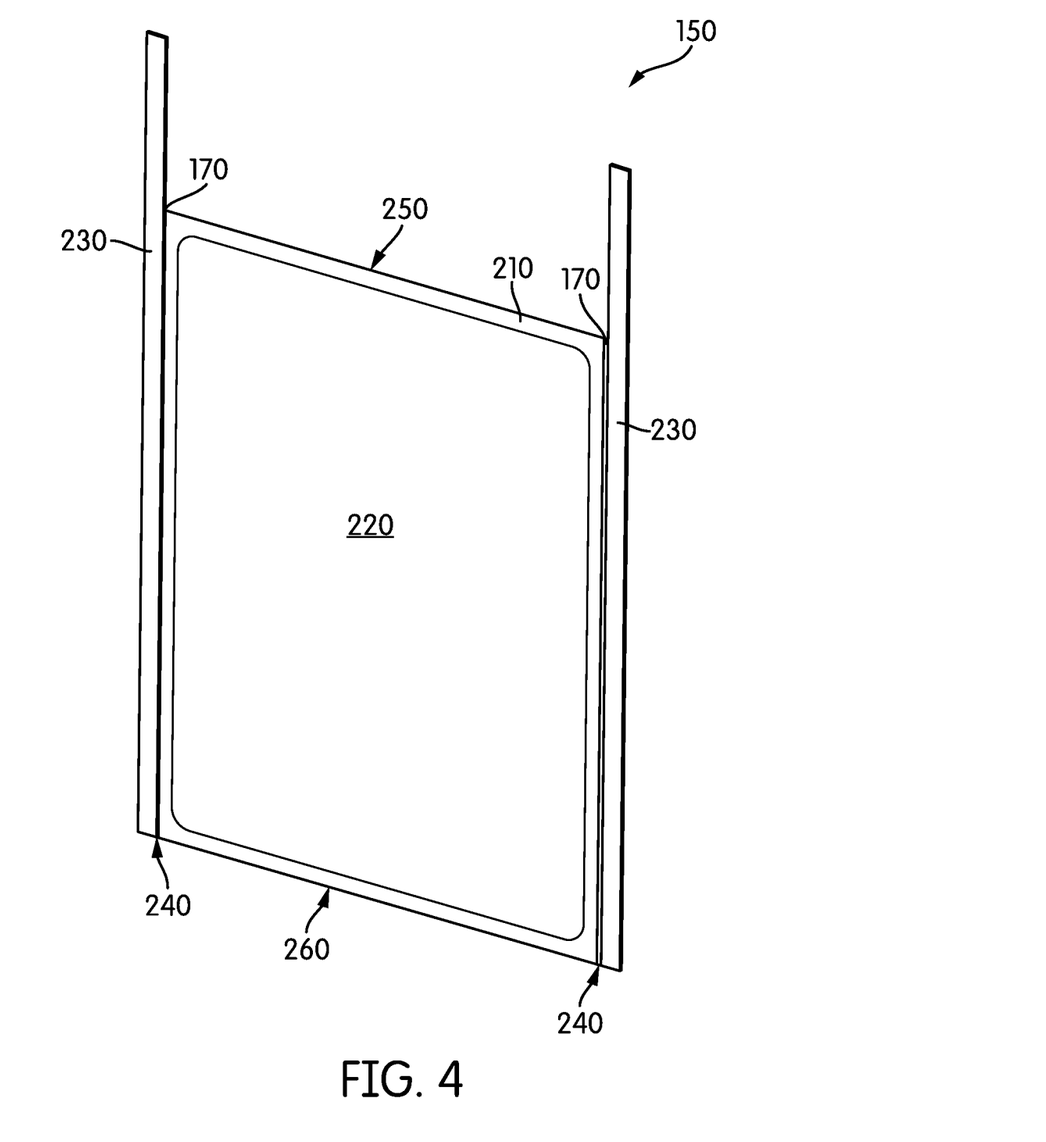
FIG. 4 shows a perspective view of the oxidant electrode according to an embodiment.

It may be appreciated that in some embodiments the oxidant electrode 150 may be assembled by sintering or otherwise pressing the various layers together. In some embodiments, the increased strength of the graphite particles 200 in the oxidant electrode 150 may facilitate uniformity of the layers at the edges of the oxidant electrode 150 during sintering or other assembly processes, which may prevent leakage paths for the ionically conductive medium when the oxidant electrode 150 is assembled into the cell 100, as described below. Illustrated in FIG. 4 is an embodiment of an assembled oxidant electrode 150. As shown, in some embodiments, assembling the oxidant electrode 150 may include border pressing edges 210 of the oxidant electrode 150, so as to collapse pore structures within at least the active layer 160 that generally facilitate permeability of the ionically conductive medium therein, so as to increase surface area exposure thereto. In some embodiments, such border pressing may comprise pressing at least a portion of the edges 210 of the oxidant electrode 150 at a higher pressure than the rest of the electrode, at room or elevated temperature, in order to collapse the pore structure in that region. The size of the edges 210 may vary across embodiments. For example, in some embodiments, the edges 210 may be defined as a border region of a particular thickness (i.e. 1 cm) around the perimeter of the oxidant electrode 150. It may be appreciated that the size of the edges 210 may vary around the perimeter. For example, in some embodiments the edges 210 may be thicker or thinner at the corners of the oxidant electrode 150, than at the sides, top, and bottom of the oxidant electrode 150. In some embodiments, a center region 220 of the oxidant electrode 150 may be surrounded by the edges 210, such that the edges 210 support the oxidant electrode 150 while presenting the center region 220 for use in the cell 100. It may be appreciated that border pressing the edges 210 of the oxidant electrode 150 may make the edges 210 less susceptible to wetting than center region 220, as described in greater detail below. Furthermore, in some embodiments the border-pressed edges 210 may be more solvophobic, but less air-permeable, which may facilitate a stronger bond when sealing the oxidant electrode 150 into the cell 100.

As shown in FIG. 4, in some embodiments the current collector 170 may extend from opposing sides 240 of the oxidant electrode 150, so as to couple with associated conductors 230, which may electrically connect the oxidant electrode 150 to the terminals of the cell 100. In other embodiments, the current collector might only extend from one side 240, or might extend from the top 250 and/or bottom 260 of the oxidant electrode 150. The conductors 230 may be of any construction or configuration, including but not limited to the conductive metals described above. In some embodiments the conductors 230 may be copper, that surround an engaging portion of the current collector 170 extending from the oxidant electrode 150. Although the current collector 170 may extend from either or both of the sides 240 to electrically couple to the conductors 230, it may be appreciated that in some embodiments the graphite particles 200 of the graphite layer 180 and/or the second graphite layer 180' may be configured to prevent the current collector 170 from protruding through the opposing faces of the oxidant electrode 150 (i.e. those that would be oriented towards the air or the ionically conductive medium) during assembly processing of the oxidant electrode 150. As an example, in some embodiments the graphite particles 200 may prevent portions of the current collector 170 from breaking through the surfaces of the layers during border pressing of the edges 210. As discussed in greater detail below, in some cases protrusion of the current collector 170 through the opposing faces of the oxidant electrode 150, such as through the active layer 160, may otherwise hinder the mounting of the oxidant electrode 150, or facilitate a leakage path therethrough.

Figure 5:
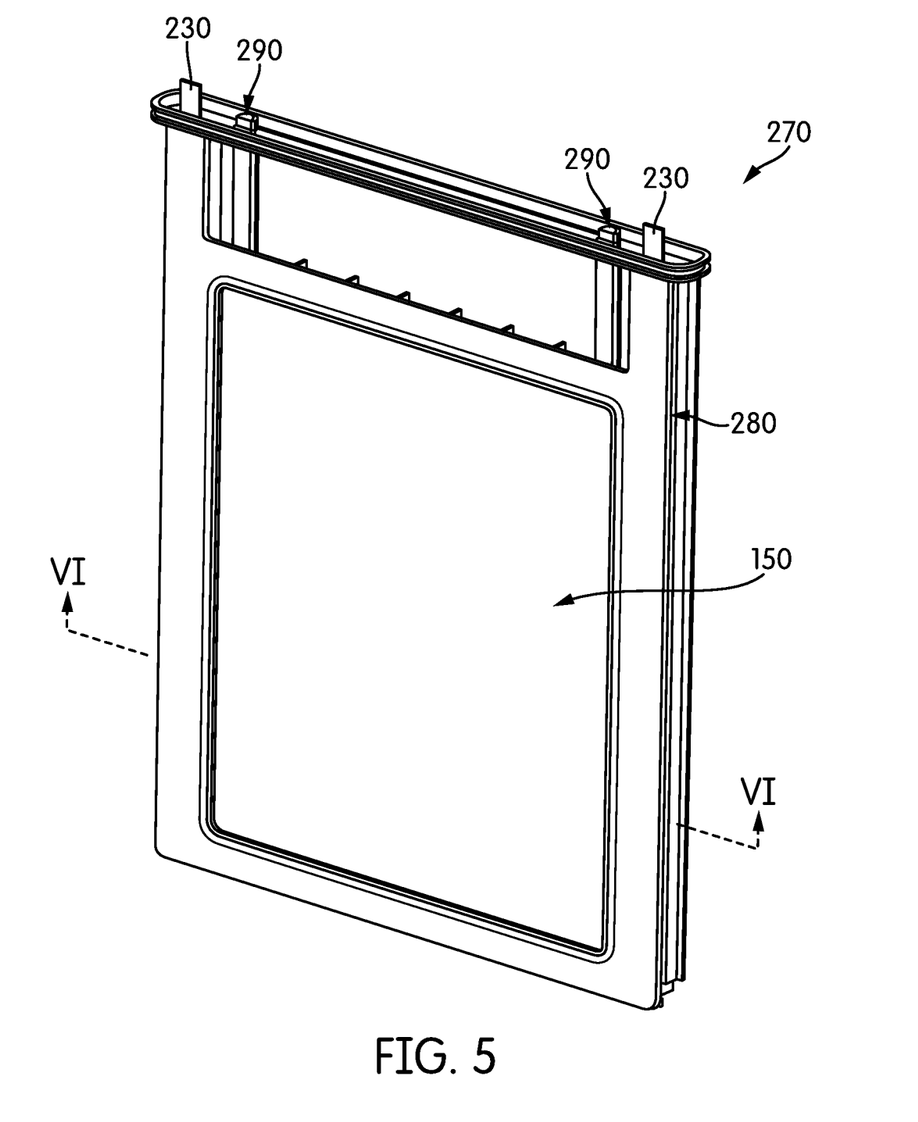
FIG. 5 shows the oxidant electrode of FIG. 4 assembled into an immersible oxidant electrode module configured for immersion into ionically conductive medium.

The oxidant electrode 150 may be assembled into the cell 100 in different ways across various embodiments. For example, in some embodiments, such as was illustrated in the schematic view of FIG. 1A, the oxidant electrode 150 may mount directly to a portion of the housing 110, so as to prevent the ionically conductive medium in the cell chamber 120 from leaking outside the cell 100. In other embodiments, such as was illustrated in the schematic view of FIG. 1B, the oxidant electrode 150 may be mounted to an oxidant electrode module that is assembled into the cell 100 (i.e. by being immersed into the ionically conductive medium within the housing 110). FIG. 5 depicts such an embodiment, whereby an oxidant electrode module 270 is configured to receive the oxidant electrode 150 therein. As shown, the oxidant electrode 150 may be sealed to a module housing 280, so as to form an air-space therein. An air channel may be formed in the air space between one or more air ports 290. In some embodiments, a first one of the air ports 290 may be an air inlet, while a second one of the air ports 290 may be an air outlet. Regardless of the body to which the oxidant electrode 150 is mounted, it may be appreciated that in some embodiments the oxidant electrode 150 is adhered thereto with glue. In various such embodiments, the glue utilized may comprise one or more of ABS cements, epoxies, or other sealants, including but not limited to those from one or more of Oatey, Weld-on, Eager Polymer, MagnaTec, Scotchweld, and Resinlab. It may be appreciated however, that some glues such as those listed typically do not adhere well to certain metals, including, for example, the Nickel metal or alloy that might be utilized in the current collector 170. Conversely, it may be appreciated that the graphite particles 200 of the graphite layer 180 may promote a stronger adhesion with the glue, which may prevent a leakage path between the glue and the oxidant electrode 150. In embodiments where the current collector is embedded in the graphite layer 180, or is otherwise surrounded by the graphite layer 180 and the second graphite layer 180', the opposing faces of the current collector 170 may both benefit from increased adhesion facilitated by the graphite particles.

Figure 6:
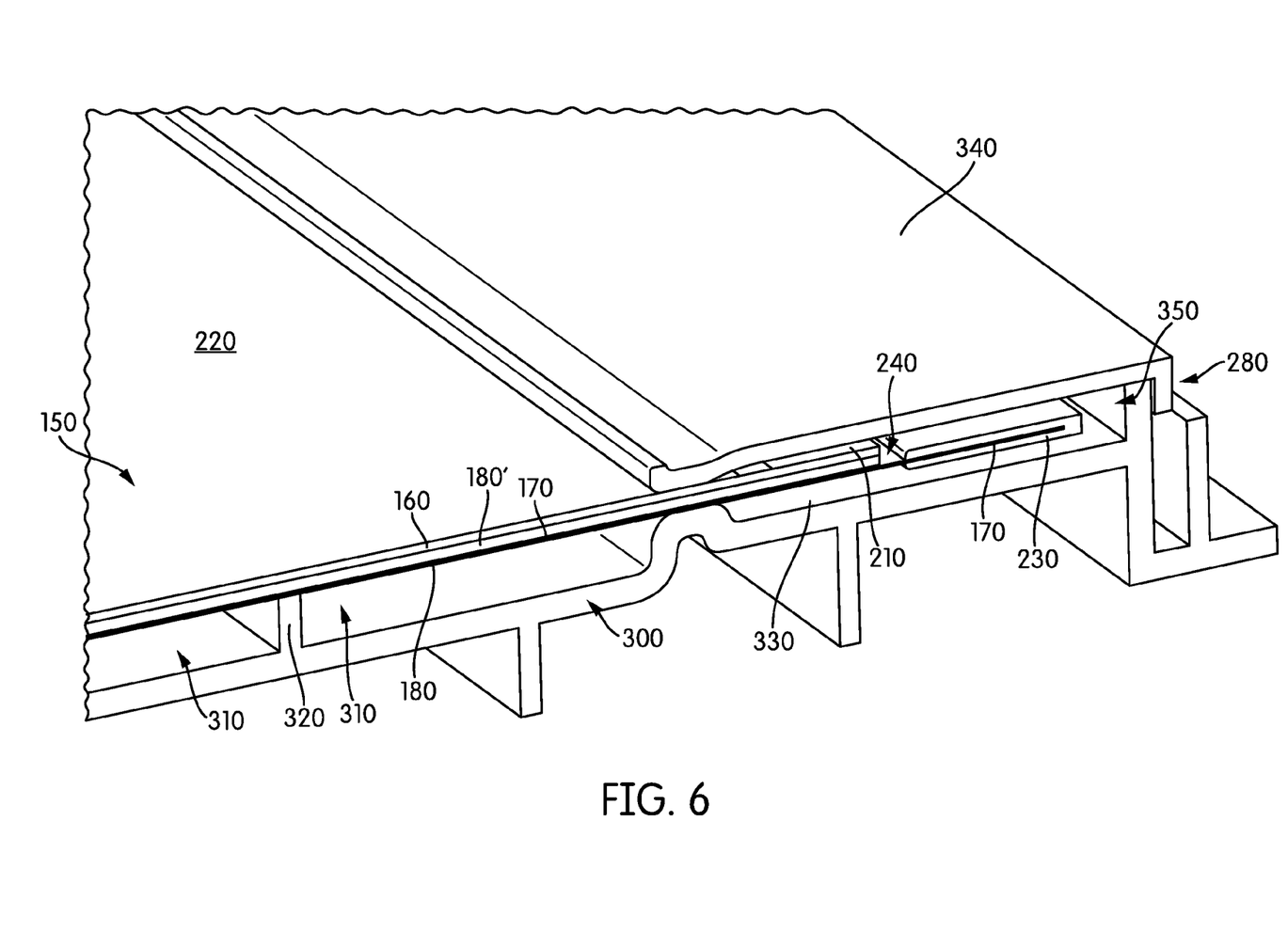
FIG. 6 shows a cross sectional view of the oxidant electrode assembled into the oxidant electrode module of FIG. 5, with a sealant space located at an edge thereof.

Shown in FIG. 6 is a cross sectional perspective view of the engagement between the oxidant electrode 150 and module housing 280, cut along the line VI in FIG. 5. As shown, the module housing 280 may contain therein a backing portion 300 that is configured to face the air-facing side of the oxidant electrode 150, and define an air channel 310 therein. As shown, air baffle portions 320 may be provided to define the shape of the air channel 310 between the air ports 290. As also shown, a border region 330 of the backing portion 300 may be configured to receive the edges 210 of the oxidant electrode 150 (as well as the conductors 230 proximal to the sides 240 in some embodiments). The border region 330 of the backing portion 300 may be configured to engage a border cover 340, so as to surround the edges 210 (and potentially the conductors 230), so as to form a sealant space 350 therebetween. It may be appreciated that in some cases leakage of ionically conductive medium into an immersed oxidant electrode module 270 may be of greater detriment to the cell 100 than leakage of the ionically conductive medium out of the cell 100, because while in both embodiments there is a reduction in the level of ionically conductive medium available to conduct ions between the electrodes in the cell, the leakage into the immersed oxidant electrode module 270 further fills the air space, reducing the usable area of the oxidant electrode 150.

Accordingly, when the sealant space 350 is filled with a sealant 360 such as the glue described above, as depicted in FIG. 7, or where the sealant 360 is otherwise applied thereto, the adhesion of the sealant 360 to the graphite layer 180 in the sealant space 350, may generally prevent ionically conductive medium from traversing between the sealant 360 and the oxygen electrode 150, to form a leak path to the air side of the oxidant electrode 150. It may be appreciated that in embodiments containing the barrier layer 175 and the graphite layer 180, as opposed to both the graphite layer 180 and the second graphite layer 180', generally only a graphite border region 370 and a graphite side region 380 of the graphite layer 180 would generally provide surfaces for increasing adhesion to the sealant 360. In embodiments such as that illustrated, however, where the barrier layer 175 is replaced by the second graphite layer 180'. The adhesion of the sealant 360 to the second graphite layer 180' at the side 240 of the oxidant electrode 150 may also assist in preventing ionically conductive medium from leaking around the oxygen electrode 150. Although in some cases the sealant 360 might not adhere well to the current collector 170, specifically at those portions of the current collector 170 that protrude from the oxidant electrode 150 towards the conductors 230, the strengthened bond of the sealant 360 to the graphite layer 180 and/or the second graphite layer 180' may close this potential leak path, and may generally prevent the ionically conductive medium from entering the air channel 310 of the oxidant electrode module 270. Likewise, where the sealant 360 is used to seal the oxidant electrode 150 to the cell housing 110, the adhesion between the sealant 360 and the oxidant electrode 150 may generally prevent the ionically conductive medium from undesirably leaking out of the cell 100. As indicated above, while wetting of the active layer 160 may generally allow some ionically conductive medium to enter the sealant space 350, border pressing of the edges 210 may further prevent the ionically conductive medium from reaching the side 240, across the active layer 160, where it could potentially interfere with the generally weaker engagement between the sealant 360 and the current collector 170.

Figure 7:
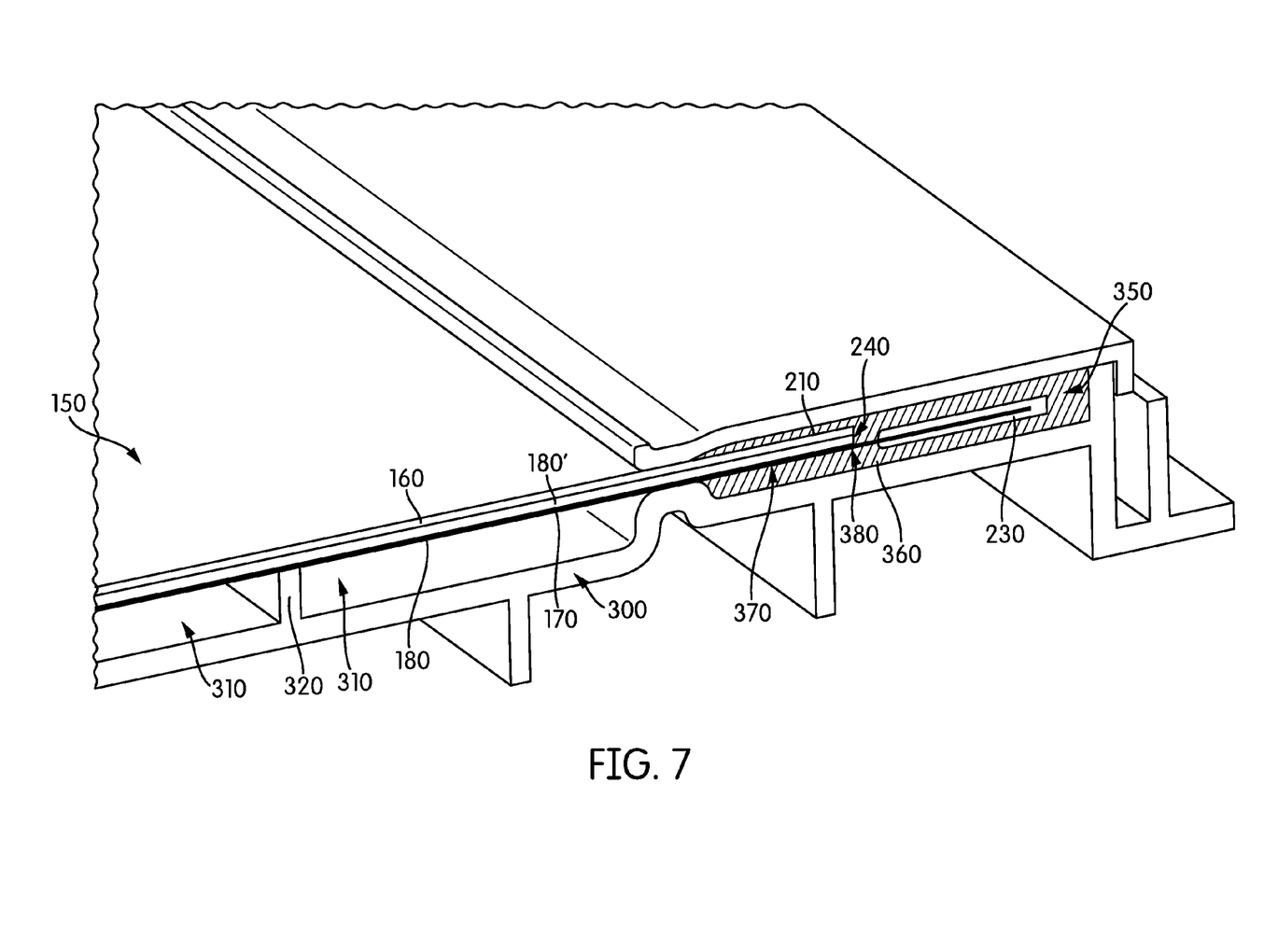
FIG. 7 shows the view of FIG. 6, as filled with a sealant at the edge of the oxidant electrode module.

Although in the macroscopic view of FIG. 7 the sealant 360 is shown as surrounding the layers of the oxidant electrode 150 proximal to the edge 210 and side 240, it may be appreciated that in some embodiments the sealant 360 may permeate at least partially into and/or between one or more of the layers, which may further promote the connection thereto. In some embodiments, the edges of the layers (including, for example, areas adjacent to the edge 210 may be crimped or otherwise pressed together. Additionally, in some embodiments, some layers may extend further than others at the edges 210. It may be appreciated, then, that in various embodiments the sealant 360 might not contact each of the layers of the oxidant electrode 150, but rather only contact a subset of the layers, such as just an outermost layer. In some embodiments, the active layer 160 might not extend as far as the edge 210 of the graphite layer 180. Accordingly, in some embodiments the sealant 360 might not be applied to the active layer 160, but instead would only be applied to the graphite layer 180, the second graphite layer 180', and/or other layers of the oxidant electrode 150.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Thus, the present invention is intended to encompass all modifications, substitutions, alterations, and equivalents within the spirit and scope of the following appended claims.

What is claimed is:

1. An electrochemical cell comprising: a housing; a fuel electrode comprising a metal fuel; an oxidant electrode spaced from the fuel electrode and mounted in an opening of the housing, having a fuel electrode-facing side and an oxidant-facing side; and a liquid ionically conductive medium for conducting ions between the fuel and oxidant electrodes to support electrochemical reactions at the fuel and oxidant electrodes; the fuel electrode and the oxidant electrode being configured to, during discharge, oxidize the metal fuel at the fuel electrode and reduce a gaseous oxidant at the oxidant electrode to generate a discharge potential difference therebetween for application to a load; and the oxidant electrode comprising: an active layer in contact with the liquid ionically conductive medium that is configured to participate in the electrochemical reactions at the oxidant electrode; a current collector electrically coupled to the active layer; and an air permeable graphite layer comprising a mixture of graphite particles and solvophobic binder separately applied on a surface of the oxidant electrode that is distal from the active layer and on the oxidant-facing side, the graphite layer providing an outer surface of the oxidant electrode along at least a portion of a peripheral border thereof for sealing to the housing, and wherein at least a portion of a peripheral border of the oxidant electrode extends into a sealant space of said housing and is electrically coupled to a conductor within said sealant space; wherein the sealant space contains an electrically non-conductive adhesive sealant such that the conductor is electrically insulated from said housing and wherein the conductor extends out from the housing for coupling to a terminal of the cell; wherein said adhesive sealant is applied to at least a portion of the graphite layer of the oxidant electrode along said peripheral border and wherein the adhesive sealant couples the portion of the graphite layer to a portion of the housing so as to adhere the oxidant electrode to the housing.

2. The electrochemical cell of claim 1, wherein the solvophobic binder comprises a fluoropolymer material.

3. The electrochemical cell of claim 2, wherein the fluoropolymer material comprises polytetrafluoroethylene.

4. The electrochemical cell of claim 1, wherein the graphite particles comprise approximately 10-80% by weight of the graphite layer.

5. The electrochemical cell of claim 1, wherein the oxidant electrode further comprises a second graphite layer, separate from the graphite layer, provided between the active layer and the current collector such that the graphite layer and the second graphite layer surround the current collector.

6. The electrochemical cell of claim 5, wherein the second graphite layer comprises an associated mixture of graphite particles and solvophobic binder.

7. The electrochemical cell of claim 6, wherein the solvophobic binder of the associated mixture of the second graphite layer comprises a fluoropolymer material.

8. The electrochemical cell of claim 6, wherein the graphite particles of the associated mixture comprises approximately between 10-80% by weight of the second graphite layer.

9. The electrochemical cell of claim 1, further comprising a charging electrode selected from the group consisting of (a) the oxidant electrode, (b) a separate charging electrode spaced from the fuel and oxidant electrodes, and (c) a portion of the fuel electrode.

10. The electrochemical cell of claim 9, wherein the fuel electrode and the charging electrode are configured to, during re-charge, reduce a reducible species of the metal fuel to electrodeposit the metal fuel on the fuel electrode and oxidize an oxidizable species of the oxidant by application of a re-charge potential difference therebetween from a power source.

11. The electrochemical cell of claim 10, wherein the reducible species of the metal fuel comprises ions of zinc, iron, aluminum, magnesium, or lithium, and wherein the metal fuel is zinc, iron, aluminum, magnesium, or lithium.

12. The electrochemical cell of claim 1, wherein the oxidant electrode has a peripheral border comprising two opposing and substantially parallel sides, wherein the oxidant electrode is electrically coupled to two conductors that extend along said opposing and substantially parallel sides of the peripheral border of the oxidant electrode.

13. The electrochemical cell of claim 1, wherein the liquid ionically conductive medium comprises an aqueous electrolyte solution that comprises sulfuric acid, phosphoric acid, triflic acid, nitric acid, potassium hydroxide, sodium hydroxide, sodium chloride, potassium nitrate, or lithium chloride.

14. The electrochemical cell of claim 1, wherein the oxidant electrode is compressed along a border thereof such that the border has a pore structure that is more collapsed as compared to that of a center region of the oxidant electrode.

15. The electrochemical cell of claim 14, wherein the graphite layer is adhered to the housing by the sealant at the border of the oxidant electrode.

16. An oxidant electrode for an electrochemical cell utilizing a fuel electrode comprising a metal fuel and a liquid ionically conductive medium configured to conduct ions between the fuel electrode and the oxidant electrode to support electrochemical reactions at the fuel and oxidant electrodes, the oxidant electrode comprising:
an active layer for contact with the liquid ionically conductive medium configured to participate in the electrochemical reactions at the oxidant electrode;
a current collector electrically coupled to the active layer; and
an air permeable graphite layer comprising a mixture of graphite particles and solvophobic binder separately applied on a surface of the oxidant electrode that is distal from the active layer and on the oxidant-facing side, the graphite layer providing an outer surface of the oxidant electrode along at least a portion of a peripheral border thereof for sealing to a housing via an adhesive sealant;
wherein at least a portion of a peripheral border of oxidant electrode extends into a sealant space of said housing and is electrically coupled to a conductor within said sealant space;
wherein the sealant space contains an electrically non-conductive adhesive sealant such that the conductor is electrically insulated from said housing and wherein the conductor extends out from the housing for coupling to a terminal of the cell; and
wherein said adhesive sealant being applied to at least a portion of the graphite layer of the oxidant electrode along said peripheral border, wherein the adhesive sealant couples the portion of the graphite layer to a portion of the housing so as to adhere the oxidant electrode to the housing.

17. The oxidant electrode of claim 16, wherein the solvophobic binder comprises a fluoropolymer material.

18. The oxidant electrode of claim 17, wherein the fluoropolymer material comprises polytetrafluoroethylene.

19. The oxidant electrode of claim 16, wherein the graphite particles comprise approximately 10-80% by weight of the graphite layer.

20. The oxidant electrode of claim 16, wherein the oxidant electrode further comprises a second graphite layer, separate from the graphite layer, provided between the active layer and the current collector such that the graphite layer and the second graphite layer surround the current collector.

21. The oxidant electrode of claim 20, wherein the second graphite layer comprises an associated mixture of graphite particles and solvophobic binder.

22. The oxidant electrode of claim 21, wherein the solvophobic binder of the associated mixture of the second graphite layer comprises a fluoropolymer material.

23. The graphite particles of the associated mixture comprises approximately between 10-80% by weight of the second graphite layer.

24. The oxidant electrode of claim 16, further comprising a charging electrode selected from the group consisting of (a) the oxidant electrode, (b) a separate charging electrode spaced from the fuel and oxidant electrodes, and (c) a portion of the fuel electrode.

25. The oxidant electrode of claim 24, wherein the fuel electrode and the charging electrode are configured to, during re-charge, reduce a reducible species of the metal fuel to electrodeposit the metal fuel on the fuel electrode and oxidize an oxidizable species of the oxidant by application of a re-charge potential difference therebetween from a power source.

26. The oxidant electrode of claim 25, wherein the reducible species of the metal fuel comprises ions of zinc, iron, aluminum, magnesium, or lithium, and wherein the metal fuel is zinc, iron, aluminum, magnesium, or lithium.

27. The oxidant electrode of claim 16, wherein the oxidant electrode has a peripheral border comprising two opposing and substantially parallel sides, wherein the oxidant electrode is electrically coupled to two conductors that extend along said opposing and substantially parallel sides of the peripheral border of the oxidant electrode.

28. The oxidant electrode of claim 16, wherein the liquid ionically conductive medium comprises an aqueous electrolyte solution that comprises sulfuric acid, phosphoric acid, triflic acid, nitric acid, potassium hydroxide, sodium hydroxide, sodium chloride, potassium nitrate, or lithium chloride.

29. The oxidant electrode of claim 16, wherein the oxidant electrode is compressed along a border thereof such that the border has a pore structure that is more collapsed as compared to that of a center region of the oxidant electrode.

30. The electrochemical cell of claim 1, wherein the oxidant electrode further comprises an electrically conductive barrier layer that is air permeable and liquid impermeable between the active layer and the graphite layer.

31. The electrochemical cell of claim 30, wherein the current collector is at least partially embedded in the barrier layer.

32. The electrochemical cell of claim 1, wherein the coupling of the portion of the graphite layer to the portion of the housing via the adhesive sealant forms an oxidant receiving space between another portion of the graphite layer and an outer wall of the housing of the electrochemical cell.

33. The electrochemical cell of claim 1, wherein the coupling of the portion of the graphite layer to the portion of the housing via the adhesive sealant forms an oxidant receiving space between another portion of the graphite layer and an oxidant electrode module housing immersed in the liquid ionically conductive medium.

34. The electrochemical cell of claim 33, wherein the portion of the oxidant electrode module housing to which the sealant couples the portion of the graphite layer comprises at least one baffle portion, the at least one baffle portion defining the oxidant receiving space.

35. The electrochemical cell of claim 34, wherein the oxidant electrode module housing comprises said sealant space for receipt of the sealant, the sealant space surrounding at least a portion of the peripheral border of the oxidant electrode, and wherein the portion of the oxidant electrode module housing to which the sealant couples the portion of the graphite layer to the oxidant electrode module housing is within the sealant space and wherein the oxidant electrode module housing is a separate component of the electrochemical cell configured for immersion into the liquid ionically conductive medium.

36. The oxidant electrode of claim 16, wherein the oxidant electrode further comprises an electrically conductive barrier layer that is air permeable and liquid impermeable between the active layer and the graphite layer.

37. The oxidant electrode of claim 34, wherein the current collector is at least partially embedded in the barrier layer.

38. The oxidant electrode of claim 16, wherein the housing is an oxidant electrode module housing for immersion in the liquid ionically conductive medium, and wherein the sealing of the graphite layer to the oxidant electrode module housing via the adhesive sealant forms an oxidant receiving space between another portion of the graphite layer and the oxidant electrode module housing in the liquid ionically conductive medium and wherein the oxidant electrode module housing is a separate component of the electrochemical cell configured for immersion into the liquid ionically conductive medium.

39. The electrochemical cell of claim 1, wherein the electrically non-conductive adhesive sealant fills the sealant space.

40. The oxidant electrode of claim 16, wherein the electrically non-conductive adhesive sealant fills the sealant space.

* * * * *